(12) United States Patent
Funken et al.

(10) Patent No.: US 6,856,048 B2
(45) Date of Patent: Feb. 15, 2005

(54) LINEAR MOTOR FOR A LINEAR DRIVE MECHANISM OF A MAGNET LEVITATION TRANSPORT SYSTEM

(75) Inventors: Peter Funken, Frenchen (DE); Christian Rosin, Reichling (DE)

(73) Assignees: Thyssenkrupp Transrapid GmbH, Kassel (DE); NKT Cables GmbH, Köln (DE)

( * ) Notice: Subject to any disclaimer, the term of this patent is extended or adjusted under 35 U.S.C. 154(b) by 0 days.

(21) Appl. No.: 10/220,743

(22) PCT Filed: Feb. 6, 2001

(86) PCT No.: PCT/EP01/01253

§ 371 (c)(1),
(2), (4) Date: Sep. 4, 2002

(87) PCT Pub. No.: WO01/67585

PCT Pub. Date: Sep. 13, 2001

(65) Prior Publication Data

US 2003/0025404 A1 Feb. 6, 2003

(51) Int. Cl.$^7$ .......................... H02K 41/02; H02K 15/06
(52) U.S. Cl. ........................................................ 310/12
(58) Field of Search ............................. 310/12, 91, 207

(56) References Cited

U.S. PATENT DOCUMENTS

| 2,112,264 | A | * | 3/1938 | Bowles et al. .............. 139/134 |
| 3,622,818 | A | * | 11/1971 | Payen ........................ 310/13 |
| 3,667,398 | A | * | 6/1972 | English ...................... 104/294 |
| 3,712,240 | A | * | 1/1973 | Donlon et al. .............. 104/292 |
| 4,246,694 | A | * | 1/1981 | Raschbichler et al. ........ 29/596 |
| 4,274,020 | A | * | 6/1981 | Parsch et al. ................ 310/13 |
| 4,310,966 | A | * | 1/1982 | Breitenbach ................ 29/596 |
| 4,360,748 | A | * | 11/1982 | Raschbichler et al. ........ 310/13 |
| 5,327,637 | A | * | 7/1994 | Breitenbach et al. ......... 29/596 |
| 5,628,253 | A | * | 5/1997 | Ozeki et al. ................ 104/292 |
| 5,889,340 | A | * | 3/1999 | Miller et al. ................ 310/12 |
| 6,124,550 | A | * | 9/2000 | Funken et al. ............... 174/78 |
| 2003/0025404 | A1 | * | 2/2003 | Funken et al. ............... 310/13 |

FOREIGN PATENT DOCUMENTS

| DE | 26 56 389 | 6/1978 |
| DE | 28 24 951 | 12/1979 |
| DE | 37 37 719 | 5/1989 |
| DE | 197 24 283 | 12/1998 |
| DE | 198 33 418 | 6/1999 |

* cited by examiner

Primary Examiner—Thanh Lam
Assistant Examiner—David W. Scheuermann
(74) Attorney, Agent, or Firm—McGlew and Tuttle, P.C.

(57) ABSTRACT

The invention relates to a linear motor for a linear drive mechanism of a magnetic levitation transport system. Said linear motor comprises a plurality of inductor supports (15) which are arranged in a row and which have grooves (14) crosswise to the longitudinal direction, said grooves being substantially equal distances apart from each other; and at least three linear motor lines (1, 2, 3), which are wound into windings (16) in a meandering shape and which are located in the grooves (14) in sections. Said coils (16) have winding heads (16.1, 16.2, 16.3) situated a distance (A) apart. The invention solves the technical problem of producing the windings continuously and economically by providing that the lengths (A') of the winding heads (16.1', 16.2', 16.3') of the of the at least three linear motor lines (1, 2, 3) are extended at a point of discontinuity (100) between two adjacent inductor supports (15).

20 Claims, 4 Drawing Sheets

US 6,856,048 B2

LINEAR MOTOR FOR A LINEAR DRIVE MECHANISM OF A MAGNET LEVITATION TRANSPORT SYSTEM

FIELD OF THE INVENTION

The invention relates to a linear motor for a linear drive mechanism of a magnetic levitation transport system, with the linear motor being comprised of a plurality of inductor supports which are arranged in a row and which have grooves crosswise to the longitudinal direction, these grooves being substantially equal distances apart from each other, and at least three linear motor lines which are wound into windings in a meandering shape and which are located in the grooves in sections, with these windings having winding heads that are situated a distance (A) apart.

BACKGROUND OF THE INVENTION

The three-phase alternate-current winding of a linear motor comprises three linear motor lines laid like meanders that produce an electromagnetic moving field. For example, linear motors are used to drive a magnetic levitation transport system for long-distance express traffic.

The production and laying of the alternate-current winding of a linear motor is accomplished with a laying vehicle that is put onto the track way (DE 37 37 719 A1).

The length of a winding period is defined by the groove/tooth geometry of the inductor packages and nearly constant over the length of the track way beam. But over the entire length of the track way the inductor cannot be fabricated and/or mounted as a uniform body or with a uniform geometry, and moreover, fabrication tolerances do occur. Furthermore, the track way has interruptions which, for example, are due to butt joints at bridge structures, for setoff of differences in length between inner track and outer track or due to elongation compensators (to compensate for changes in temperature).

It is possible to consider deviations from nominal sizes in fabrication and laying of a winding, but only to such an extent as these deviations are exactly known from the very beginning on. Changes in length occurring at a point of discontinuity throughout the service life of a motor winding due to thermal expansion and dynamic loads lead to an expansion and compression load for winding heads in longitudinal track way direction.

Some examples for potential impacts of such loads are given below:

Adverse effect on functional stability with regard to operating current conductivity, operating and failure voltage strength and mechanical-geometric installation size accuracy.

Slight tolerances in length can be offset by the elastic properties of the winding heads or line. For example, this would be possible with ground level plate track ways having a length of up to 6 m. With greater lengths, the tolerances in length add-up and the motor winding cannot be fabricated continuously with a uniform size. Special measures would have to be taken in the winding guidance. It has also been contemplated to lay the motor winding with an expansion loop at a point of discontinuity for thermal and/or dynamic elongation offset. But it bears crucial disadvantages. Winding production is not possible continuously. A standstill of the assembly machine will occur at every point of discontinuity for cutting of line length and for assembly of line guidance. It entails more consumption of material (moving field line, clamps, fixing rails, etc.). In particular, a standstill of the laying machine at every point of discontinuity is extremely obstructive.

SUMMARY OF THE INVENTION

The technical problem to be solved by the invention therefore is to propose a winding formation for a linear motor line at points of discontinuity between inductor supports that evades the outlined disadvantages and permits a continuous and low-cost winding production.

The technical problem outlined hereinabove is solved by a linear motor wherein the lengths A' of the winding heads $16.1'$, $16.2'$, $16.3'$ of at least three linear motor lines are extended at a point of discontinuity between two adjacent inductor supports. The essential point of the invention lies in that the winding heads of the meanders at the point of discontinuity are not shaped regularly but extended.

With the inventive shaping of the meanders at a point of discontinuity, the length of the winding head is stretched in longitudinal track way direction so that static deviations in length are mainly offset. The expansion and compression loads occurring with a dynamic change in length of the expansion gap between two adjacent track way beams moreover take effect upon an extended line section. Hence, the loads in total become smaller and can be absorbed by the elastic properties of the winding heads.

There are several possibilities for executing the meanders with extended winding heads. In a preferred manner, the lengths of the extended winding heads of at least three linear motor lines are extended by a mainly equal extent. It is thus ensured that after bridging the point of discontinuity, the at least three linear motor lines are again arranged in the same phase arrangement.

Furthermore, it is proposed that for simplifying the production of extended winding heads these shall be extended in pre-defined intervals depending on the length of the point of discontinuity to be offset. It means that the lengths of the winding heads are extended by an allocated pre-defined amount if the length difference to be offset lies within a pre-defined interval. Thus the differences in length are adequately compensated, without calling for absorption of too great mechanical stresses in the winding heads, while the production of extended winding heads is simplified in such a manner that the device for producing the extended winding heads must be arranged only for pre-defined differences in length.

It is furthermore purposive to configure adjacent winding heads of three phases jointly at one side of the inductor support. For ease of accessibility, it is proposed to configure the extended winding heads on the outer side of the inductor support, i.e. not at the track way inner side.

Thus the winding can be fabricated and laid continuously over the entire linear motor section, without causing any interruptions. In another patent application filed at the same time it is proposed to measure the groove/tooth geometry during the production of the meander windings by way of a measuring device in situ and to shape the meanders exactly in conformity with the measured groove/tooth geometry. With the invention presented here, it will then be easy to approach and measure points of discontinuity with the measuring facility and to shape and lay the "extended" meander configuration individually, accurately fitting, and at the exact location in fully automatic mode according to this invention.

During their service life, the extended winding heads in conformity with the invention may lose their form stability due to permanently changing loads (expansion and compression), and sink down. Hence, the winding heads might protrude out of the free space which is created by the encroachment of the rider of the magnetic levitation vehicle. Winding heads protruding beyond the free space would be touched during passage with a magnetic levitation vehicle and could be damaged.

The winding heads should therefore be fixed. Consequently, to fix the position of extended winding heads at a point of discontinuity, it is proposed to install additional fixing elements such as retainer belts or plates at the track way beam. But these are relatively costly.

Another embodiment of the invention lies in proposing a simple and low-cost additional holder for the winding heads at points of discontinuity, integrating non-occupied grooves. For this purpose, it should be possible to insert retainer means into non-occupied grooves which fix the winding heads or on which the winding heads may rest.

To this effect it is proposed to captivate at least one prefabricated rigid bar in one or several stator grooves that are not occupied by the winding, thus allowing the extended winding heads to rest on said rigid bar. These assembly services could be performed immediately after the production of the winding.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
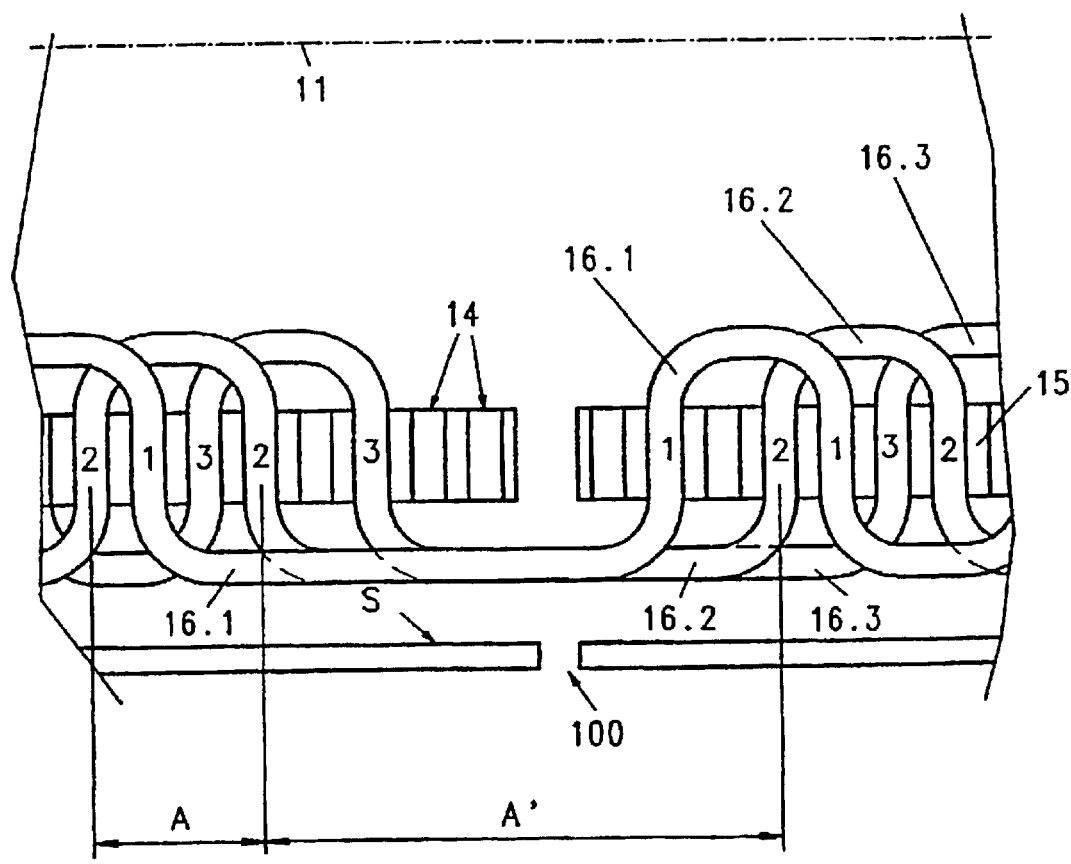
FIG. 1 is a view under the track way with a discontinuity point.
Figure 2:
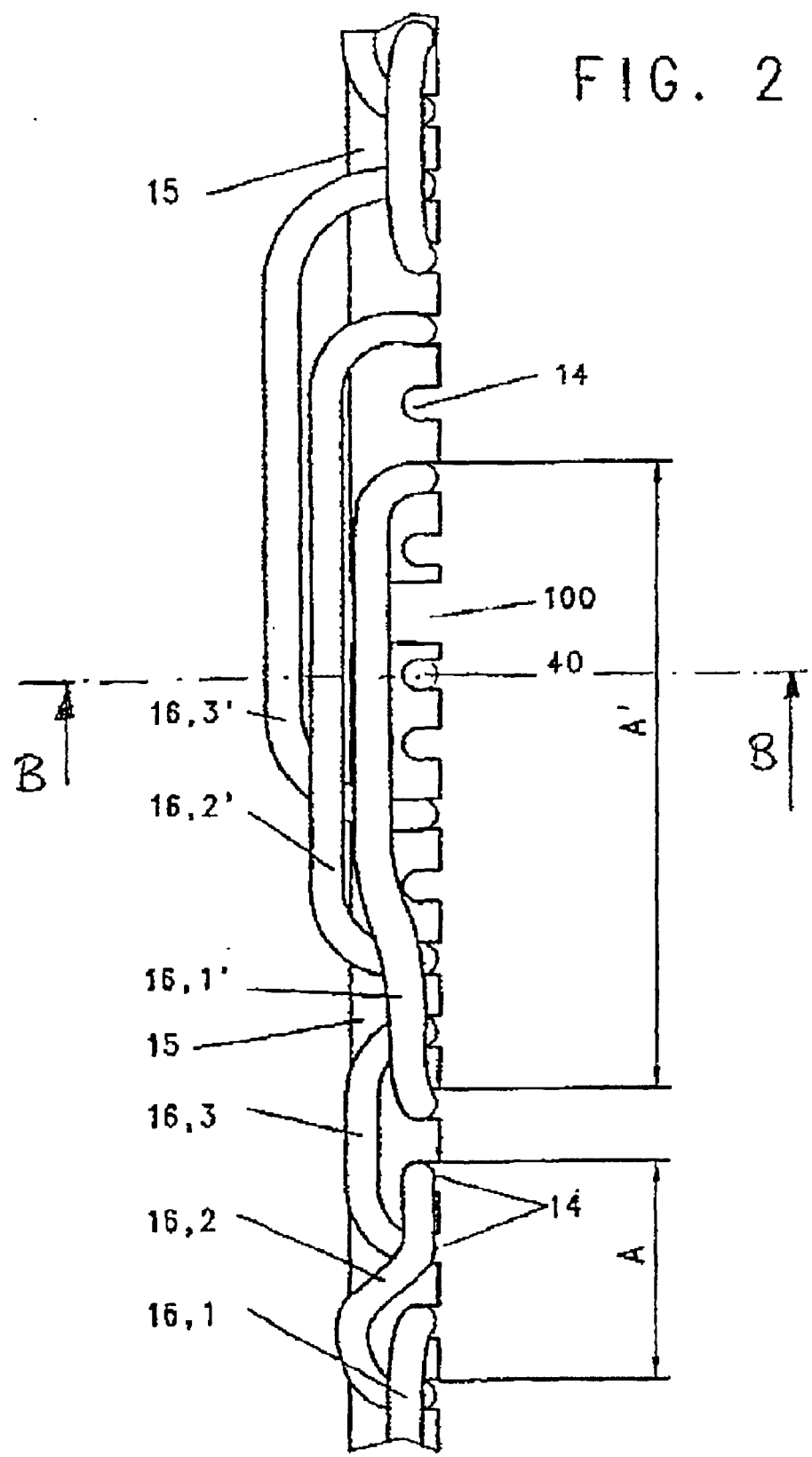
FIG. 2 is a side view of the same position.

Referring to the drawings in particular, FIGS. 1 and 2 show the course of the winding of the linear motor lines 1, 2, 3 at one point of the butt joint or of an expansion gap between two inductor supports 15. One expansion gap forms the discontinuity point 100. Upstream and downstream of the discontinuity point 100, the stator grooves 14 are densely occupied with meander-shaped windings 16. One winding period or one winding head 16.1, 16.2 and 16.3 has the length A.

Especially visible on FIG. 2 are the crimpings of the meanders. The crimpings are required because the winding heads 16.1, 16.2 and 16.3 cross each other. By laying the winding heads 16.1, 16.2, and 16.3 above each other, it is possible to fill the existing space optimally.

At the discontinuity point, the winding heads 16.1', 16.2', and 16.3' on the track way outside (reference 11=track way center) are extended in accordance with the invention, receiving the period length A' by way of the proposed measure. The period length A' roughly corresponds to the threefold of the period length A which in turn corresponds to the threefold of the distances of grooves 14 to each other. By configuring the period length A' as a multiple of the period length A, it is achieved that the spatial phase distribution along the track way is by and large undisturbed, despite the discontinuity point 100. As a matter of fact, it depends upon the width of the discontinuity point 100 how exactly the multiple of period length A can be complied with. In any case, however, by way of a smart choice of grooves 14 downstream of discontinuity point 100, it can be achieved that the deviation of period length A' from a multiple of period length A is smaller than the distance between two grooves 14.

As has been described before, FIG. 1 shows that the extended winding heads 16.1', 16.2', and 16.3' of the linear motor lines 1, 2, and 3 are situated on that side of the inductor support 15 which faces the outside of the track way. The accessibility of the extended winding heads 16.1', 16.2', and 16.3' is thereby simplified. A relatively large distance between consecutive windings of each of the linear motor lines 1, 2, and 3 is put up with. Conversely, it is also possible, for example, to occupy all grooves with windings and to extend the extended winding heads either on one or on the other side of the inductor supports. Then it is merely required to extend the winding heads by the length of the discontinuity point 100. Downstream of the discontinuity point 100, the windings 16 of the linear motor lines 1, 2, and 3 can be then be arranged in the hitherto applied sequence. If the discontinuity point 100 just represents a small gap, a nearly steady transition of the electromagnetic moving field generated by the linear motor lines 1, 2, and 3 is achieved.

As some grooves 14 remain empty near the discontinuity point 100 on FIG. 1, at least one of the non-occupied grooves can accommodate a retainer element 40 which serves for supporting the extended and crimped winding heads 16.1', 16.2', and 16.3'.

Figure 3:
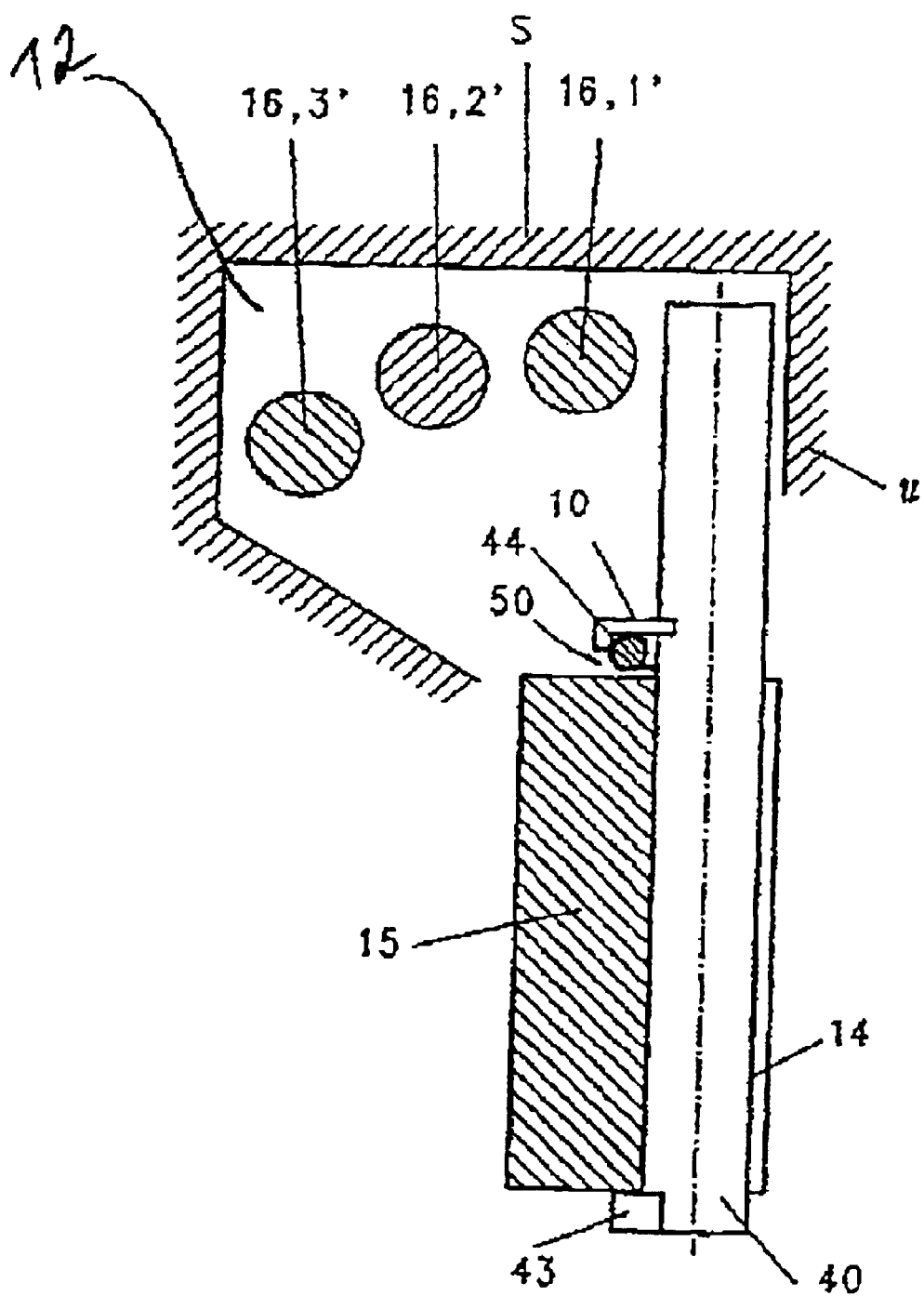
FIG. 3 is a sectional view through the side view.

FIG. 3 shows a magnified view of the section B—B through the arrangement in FIG. 2. The winding heads 16.1', 16.2', 16.3' lie in a free space 12 which is formed outwardly (S) by the lateral guide rail and downwardly (U) by the rider of the magnetic levitation transport vehicle. Inserted into one of the grooves 14 of the inductor package 15 from the inductor outside is a cylindrical retainer bar 40, supporting and retaining the lower winding head 16.1'. FIG. 3 shows that the two other winding heads 16.2' and 16.3' rest on the lower winding head. Any other form of fixing or supporting of winding heads to achieve the intended purpose is also feasible.

The retainer bar 40 is provided as a fitting made of epoxy resin and is captivated in stator groove 14. At its end and roughly in its center, the retainer bar 40 carries two collars 43 and 44 at a distance, which is slightly bigger than the groove length. The distance between the two collars 43 and 44 is properly rated to ensure a precise and safe installation position. The width 49 of the collars is smaller than the diameter of groove 14. When slid-in, the collars 43, 44 are in a position pointing downwardly (to the grove outlet side). After insertion, the retainer bar is turned by approx. 180° C. During this procedure, the collars 43 and 44 turn from the groove opening to the groove subground. In its longitudinal direction, collars 43 and 44 fix the retainer bar 40. At the outside of the inductor, a grounding line 10 is fixed in a spring channel 50. The function and meaning of a grounding line was extensively disclosed in the German patent DE 196 20 222.1 C1.

Figure 4:
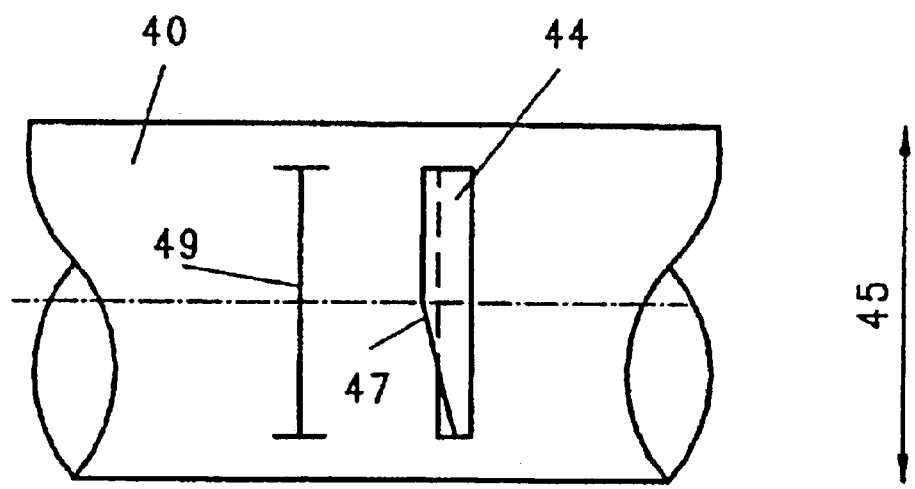
FIG. 4 is a detail view at the retainer bar.

FIG. 4 shows the detail of collar 44 at retainer bar 40. The width 49 of collar 44 is smaller than the diameter 45 of the retainer bar. The collar 44 is chamfered 47 so that, when twisted, it engages due to its elastic ductility in the final position downstream of the spring channel 50 (FIG. 3), thus preventing it from being turned-back.

While specific embodiments of the invention have been shown and described in detail to illustrate the application of the principles of the invention, it will be understood that the invention may be embodied otherwise without departing from such principles.

What is claimed is:

1. A linear motor for a linear drive mechanism of a magnetic levitation transport system, the linear motor comprising:

a plurality of inductor supports arranged in a row, said supports having grooves crosswise to a longitudinal direction, said grooves on each of said supports being substantially equal distances apart from each other and adjacent supports being spaced apart defining discontinuity points providing an enhanced distance between two adjacent grooves of two adjacent supports;

three linear motor lines wound into windings, each of said windings being in a meandering shape and with a section of each meandering shape supported and located in a respective one of said grooves of one of said supports, said windings having winding heads between said supported sections that have a regular winding head length, with lengths of said winding heads of the three linear motor lines being of an extended length across each discontinuity point between two adjacent winding sections supported in respective grooves of two different inductor supports.

2. A linear motor pursuant to claim 1, wherein the lengths of the winding heads of said three linear motor lines are extended by a substantially equal amount.

3. A linear motor pursuant to claim 1, wherein said lengths of said winding heads are extended in pre-defined intervals, depending upon the length of the discontinuity point to be offset.

4. A linear motor pursuant to claim 1, wherein said lengths of said winding heads mainly correspond to a multiple of said regular winding head length.

5. A linear motor pursuant to claim 1, wherein the extended winding heads are situated on the same side of the inductor supports.

6. A linear motor pursuant to claim 5, wherein the extended winding heads are situated on a side of said inductor supports that faces an outside of the track way.

7. A linear motor pursuant to claim 1, further comprising a retainer element for retaining extended winding heads laid into at least a groove of an inductor support which is not occupied by a winding.

8. A linear motor pursuant to claim 7, wherein the retainer element is held captive in said grove of an inductor support.

9. A linear motor pursuant to claim 7, wherein the retainer element is a cylindrical retainer bar.

10. A linear motor pursuant to claim 7, wherein the retainer element is of a non-metallic configuration.

11. A linear motor pursuant to claim 8, wherein the retainer element is a cylindrical retainer bar.

12. A linear motor pursuant to claim 8, wherein the retainer element is of a non-metallic configuration.

13. A linear motor for a linear drive mechanism of a magnetic levitation transport system, the linear motor comprising:

a plurality of inductor supports arranged in a row, said supports having grooves crosswise to a longitudinal direction, said grooves being substantially equal distances apart from each other and said inductor supports being separate forming discontinuity points between adjacent grooves of adjacent inductor supports with a greater distance between two adjacent grooves of adjacent inductor supports than two adjacent grooves of the same inductor support; and three linear motor lines, each of said motor lines being wound into a winding having a meandering shape with a section of each meandering shape supported and located in a respective one of said grooves of one of said supports, said windings having winding heads with each winding head having a length defined by said section of each meandering shape in said grooves situated a distance apart, lengths of said winding heads of the three linear motor lines being extended beyond said length at each discontinuity point between two adjacent sections supported in respective grooves of two different inductor supports.

14. A linear motor pursuant to claim 13, wherein the winding heads of said three linear motor lines have a length extended by a substantially equal amount between two adjacent inductor supports.

15. A linear motor pursuant to claim 13, wherein said winding heads of said three linear motor lines have a length extended in pre-defined intervals, depending upon the length of the discontinuity point to be offset.

16. A linear motor pursuant to claim 13, wherein said lengths of said winding heads mainly correspond to a multiple of said distance apart.

17. A linear motor pursuant to claim 13, wherein the extended winding heads are situated on a side of said inductor supports that faces an outside of the track way.

18. A linear motor pursuant to claim 13, further comprising a retainer element disposed in a groove of an inductor support which is not occupied by a winding, the retaining element retaining extended winding heads within a region.

19. A linear motor for a linear drive mechanism of a magnetic levitation transport system, the linear motor comprising:

a plurality of inductor supports arranged in a row, each of said supports having grooves crosswise to a longitudinal direction, said grooves of each of said inductor supports being substantially equal distances apart from each other, said at least two adjacent inductor supports being spaced apart forming a discontinuity of spacing between adjacent grooves of said adjacent inductor supports with a greater distance between adjacent grooves of adjacent inductor supports than two adjacent grooves of the same inductor support; and three linear motor lines wound into windings with periodic reversals of direction defining sections crosswise to a longitudinal direction and winding heads provided substantially periodically extending in a direction along each of said inductor support with each crosswise section of each winding located in a grove of a support to define a head length and with a portion of each winding extending across said discontinuity to form an extended winding head between two adjacent inductor supports, said extended winding head having an extended head length that is greater than said head length with a reversal of direction not corresponding to said periodic reversals.

20. A linear motor pursuant to claim 19, wherein said extended head length of each of said winding heads of said three linear motor lines are substantially equal with said winding extended heads extended in pre-defined intervals, depending upon the length of the discontinuity point to be offset.

* * * * *